(12) United States Patent
Schmaling et al.

(10) Patent No.: US 8,882,462 B2
(45) Date of Patent: Nov. 11, 2014

(54) LEAD STOP FOR ROTOR SYSTEM WITH FLUID-ELASTOMERIC LEAD/LAG DAMPER

(75) Inventors: David N. Schmaling, Southbury, CT (US); Ryan Thomas Casey, Hamden, CT (US)

(73) Assignee: Sikorsky Aircraft Corporation, Stratford, CT (US)

( * ) Notice: Subject to any disclaimer, the term of this patent is extended or adjusted under 35 U.S.C. 154(b) by 700 days.

(21) Appl. No.: 13/133,823

(22) PCT Filed: Dec. 9, 2008

(86) PCT No.: PCT/US2008/086024
§ 371 (c)(1),
(2), (4) Date: Jun. 9, 2011

(87) PCT Pub. No.: WO2010/068194
PCT Pub. Date: Jun. 17, 2010

(65) Prior Publication Data
US 2011/0243734 A1 Oct. 6, 2011

(51) Int. Cl.
| | |
|---|---|
| *B64C 27/51* | (2006.01) |
| *B64C 27/32* | (2006.01) |
| *B64C 27/39* | (2006.01) |
| *B64C 27/35* | (2006.01) |

(52) U.S. Cl.
CPC .............. *B64C 27/322* (2013.01); *B64C 27/51* (2013.01); *B64C 27/39* (2013.01); *B64C 27/35* (2013.01)
USPC .......................................... 416/103; 416/107

(58) Field of Classification Search
USPC ............ 416/98, 103, 105–107, 102, 153, 147
See application file for complete search history.

(56) References Cited

U.S. PATENT DOCUMENTS

| | | | |
|---|---|---|---|
| 3,759,631 | A | 9/1973 | Rybicki |
| 3,759,632 | A | 9/1973 | Rybicki |
| 3,932,059 | A | 1/1976 | Rybicki |
| 4,028,002 | A | 6/1977 | Finney et al. |
| 4,203,708 | A | 5/1980 | Rybicki |
| 4,235,570 | A | 11/1980 | Ferris et al. |
| 4,251,187 | A | 2/1981 | Hollrock |
| 4,289,448 | A | 9/1981 | DeClerco et al. |
| 4,306,836 | A | 12/1981 | Mayerjack |
| 4,342,540 | A | 8/1982 | Lovera et al. |
| 4,365,936 | A | 12/1982 | Hatch |
| 4,368,006 | A | 1/1983 | Ferris et al. |
| 4,439,106 | A | 3/1984 | Ferris et al. |
| 4,549,851 | A | 10/1985 | Pariani |
| 4,549,852 | A | 10/1985 | Hibyan |

(Continued)

FOREIGN PATENT DOCUMENTS

EP 0615904 9/1994

OTHER PUBLICATIONS

International Search Report and Written Opinion mailed Nov. 3, 2009.

(Continued)

*Primary Examiner* — Edward Look
*Assistant Examiner* — Maxime Adjagbe
(74) *Attorney, Agent, or Firm* — Carlson, Gaskey & Olds P.C.

(57) ABSTRACT

A rotor system includes a lead stop mounted to a spindle and a lead stop plate mounted to a rotor hub arm, the lead stop operable to contact the lead stop plate over a lead angle range.

14 Claims, 10 Drawing Sheets

(56) References Cited

U.S. PATENT DOCUMENTS

| | | |
|---|---|---|
| 4,551,067 A | 11/1985 | Caramaschi et al. |
| 4,588,356 A | 5/1986 | Pariani |
| 4,652,210 A | 3/1987 | Leman et al. |
| 5,059,094 A | 10/1991 | Robinson et al. |
| 5,092,738 A | 3/1992 | Byrnes et al. |
| 5,116,209 A | 5/1992 | Anglade et al. |
| 5,141,398 A | 8/1992 | Bietenhader et al. |
| 5,601,408 A | 2/1997 | Hunter et al. |
| 5,645,400 A | 7/1997 | Hunter et al. |
| 6,309,182 B1 | 10/2001 | Muylaert |
| 6,695,583 B2 | 2/2004 | Schmaling et al. |
| 6,758,466 B2 | 7/2004 | Russell |
| 6,783,327 B1 | 8/2004 | Davis |
| 7,137,624 B2 | 11/2006 | Russell et al. |
| 7,270,321 B2 | 9/2007 | Russell |
| 7,354,248 B2 | 4/2008 | Zinni |
| 7,368,158 B2 | 5/2008 | Herpin et al. |
| 2006/0067823 A1 | 3/2006 | Pancotti |

OTHER PUBLICATIONS

Supplementary Search Report for EuropeanPatent Application No. 08878798.1 dated May 27, 2013.

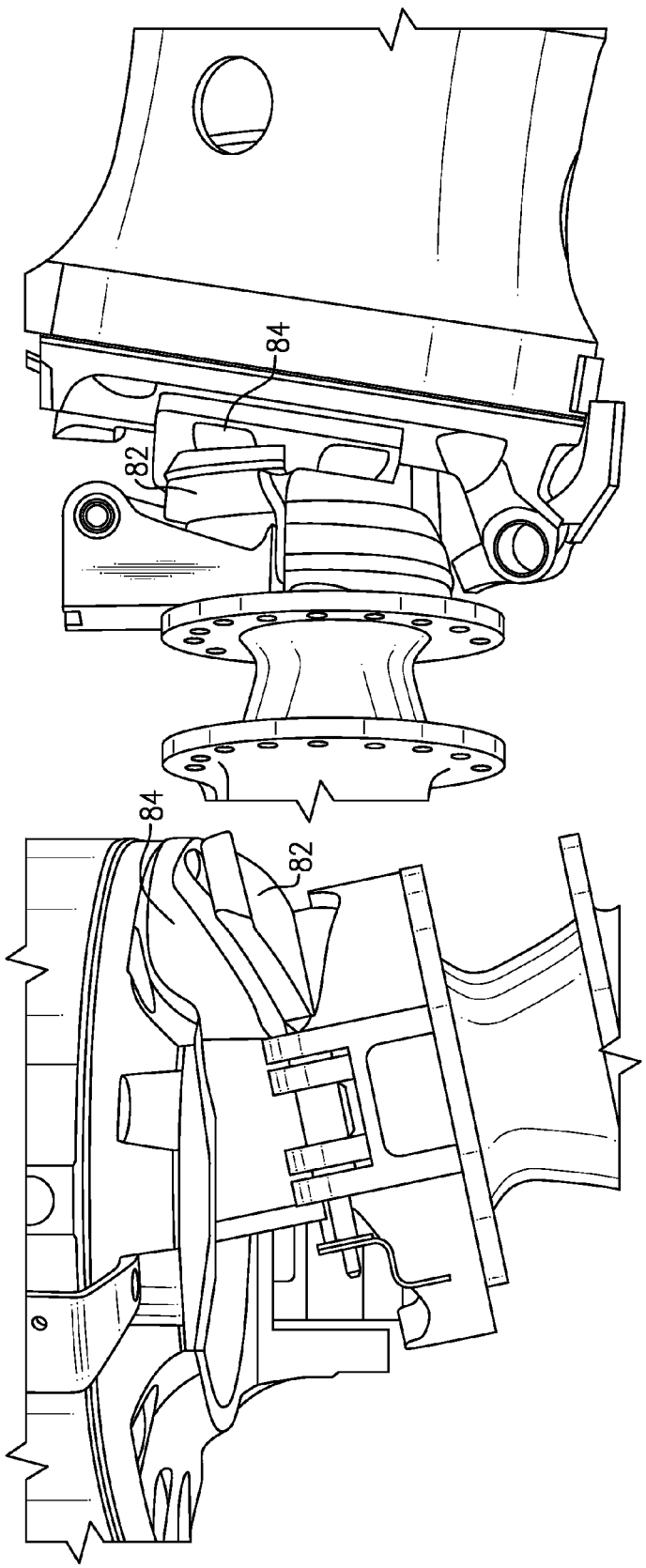

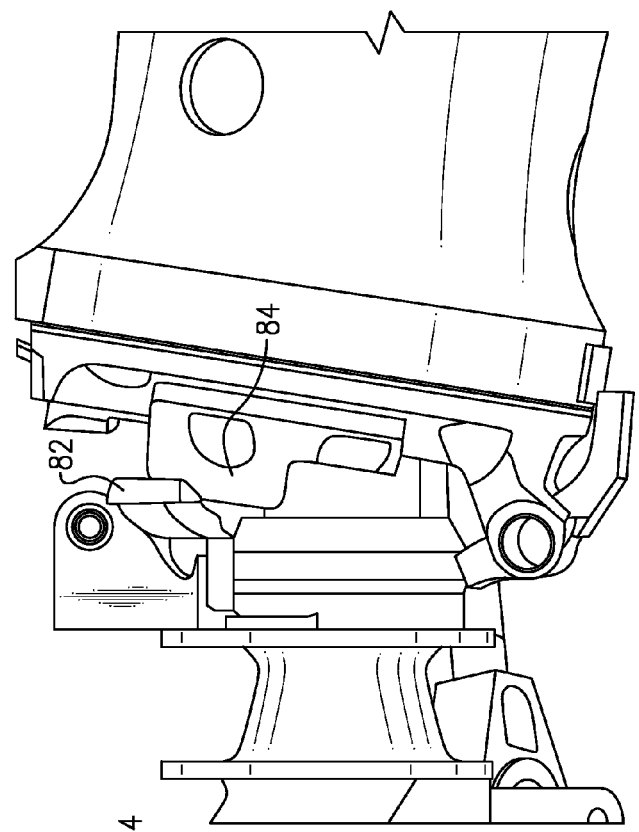
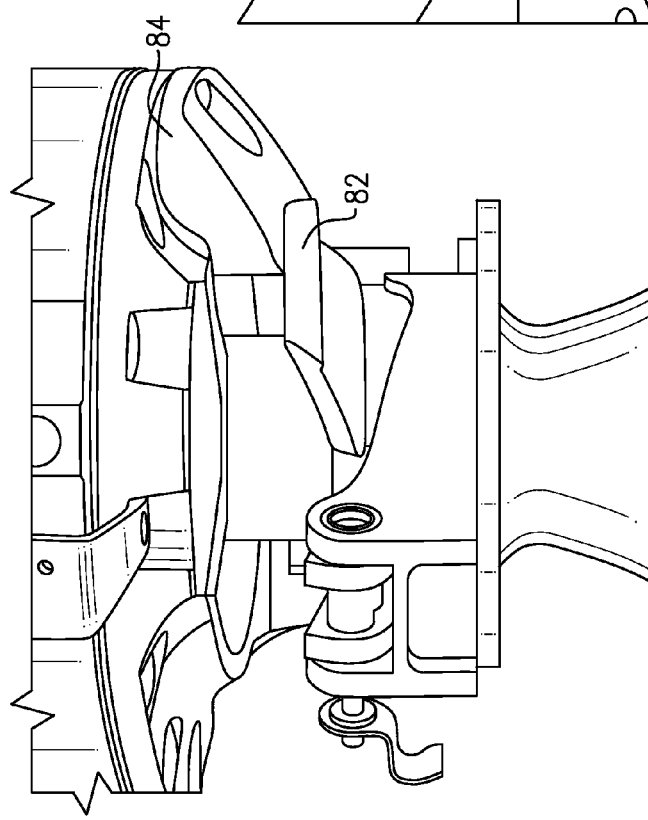

LEAD STOP FOR ROTOR SYSTEM WITH FLUID-ELASTOMERIC LEAD/LAG DAMPER

BACKGROUND

The present disclosure relates to a rotor system, and more particularly to a lead stop which facilitates usage of a fluid-elastomeric lead/lag damper.

Hydraulic main rotor lead/lag dampers are utilized on many rotary wing aircraft. A single hydraulic lead/lag damper is mounted between each rotor blade and the rotor hub to minimize ground resonance by dissipating energy in the lead/lag direction. The hydraulic lead/lag damper has internal hard stops.

Of particular concern is rotor braking when the hydraulic lead/lag damper operates in conjunction with elastomeric blade retention bearings. As the rotor brake is applied, the rotor blade leads unrestricted until the hydraulic lead/lag damper bottoms out so that the blade centrifugal force and hydraulic lead/lag damper load react the rotor braking torque. The hydraulic lead/lag damper will only react the torque when fully extended. That is, the hydraulic lead/lag damper is bottomed out and essentially becomes a tension link.

As rotor speed and centrifugal force drop in response to rotor brake engagement, the rotor blade is pulled inboard into the rotor hub arm which results in inboard-directed tension loads. To react the inboard-directed tension loads, a lead stop assembly provides a contact surface between an inboard face of a droop stop bearing and a lead stop mounted to the hinge bearing plate of the rotor hub. Contact between an inboard face of the droop stop bearing and the lead stop only occurs when the hydraulic lead/lag damper is fully extended at a known, fixed position of about 10 degrees lead. This is the only position in which the hydraulic lead/lag damper is bottomed and can generate the detrimental inboard-directed tension loads. If the rotor braking torque is reduced for any reason and the rotor blade does not lead forward 10 degrees, then the hydraulic lead/lag damper will not bottom, does not operate as a tension link and will not generate the detrimental inboard-directed tension loads. This arrangement has been highly successful but is inapplicable to a fluid-elastomeric lead/lag damper which has a spring rate K which generates a load at every rotor blade lead/lag position.

SUMMARY

A rotor system according to an exemplary aspect of the present disclosure includes an elastomeric bearing array which supports a spindle relative to a rotor hub arm. A lead/lag damper is mounted to the rotor hub arm and the spindle. A lead stop is mounted to said spindle and a lead stop plate is mounted to the rotor hub arm, the lead stop operable to contact the lead stop plate over a lead angle range.

A method of braking a rotor system according to an exemplary aspect of the present disclosure includes applying a rotor brake and contacting a lead stop with a lead stop plate at a lead angle within a lead angle range to limit a tension experienced by an elastomeric bearing array.

BRIEF DESCRIPTION OF THE DRAWINGS

Various features will become apparent to those skilled in the art from the following detailed description of certain non-limiting embodiments. The drawings that accompany the detailed description can be briefly described as follows:

FIGS. 12A and 12B illustrate lead stop assembly engagement at 10 deg lead and 0 deg pitch, with the rotor blade resting on the droop stop; and FIGS. 13A and 13B illustrate lead stop assembly engagement at 0 deg lead and Maximum positive pitch, with the rotor blade resting on the droop stop.

DETAILED DESCRIPTION

Figure 1:
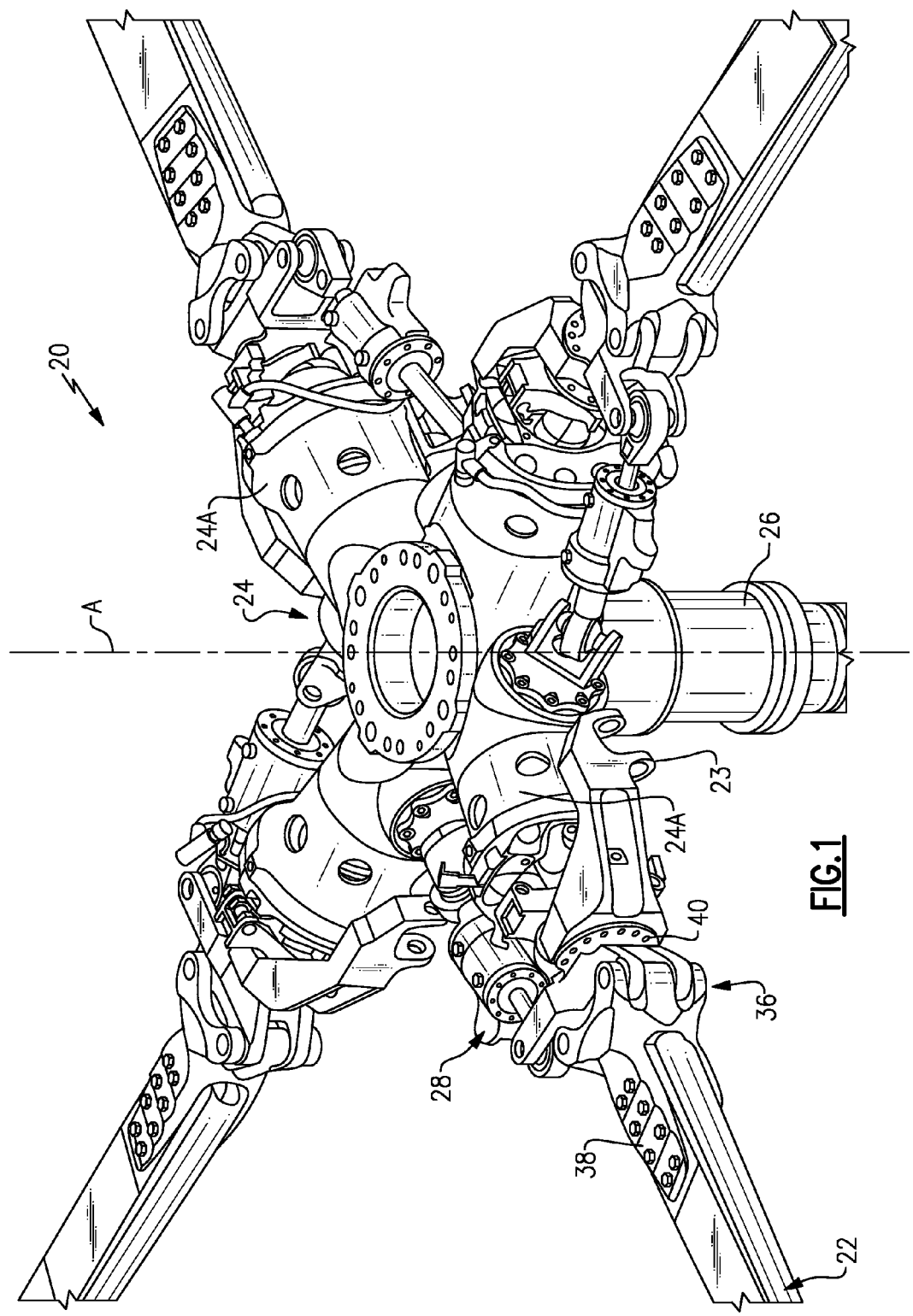
FIG. 1 is a perspective view of a rotor system.

FIG. 1 schematically illustrates a main rotor system 20. The main rotor system 20 includes a multiple of rotor blades 22 mounted to a rotor hub 24. Although a particular helicopter rotor system configuration is illustrated and described in the disclosed embodiment, other configurations and/or machines, such as high speed compound rotary-wing aircraft with supplemental translational thrust systems, dual contra-rotating, coaxial rotor system aircraft, turbo-props, tilt-rotors and tilt-wing aircraft, will also benefit herefrom.

Figure 2:
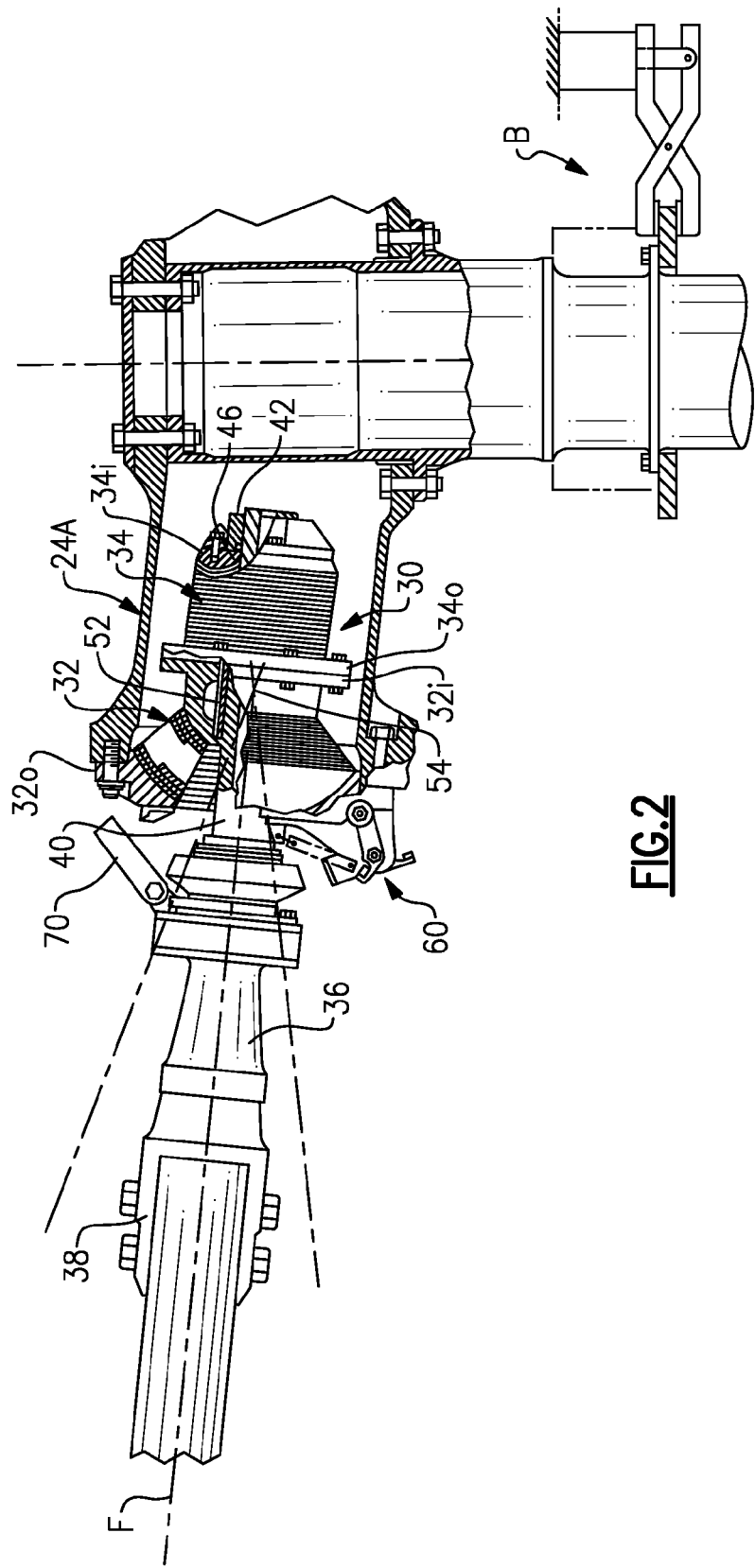
FIG. 2 is a side view, partially in cross section of a rotor system which schematically illustrates one of the hub arms and a root end connection for a rotor blade.

The rotor hub 24 includes a plurality of hub arms 24A, one of which is shown in the cross-section of FIG. 2. The rotor hub 24 is mounted to a main rotor shaft 26 which is driven about an axis of rotation A. A respective rotor blade 22 is mounted to each hub arm 24A for full articulation in pitch, droop, flap, lead and lag. A lead/lag damper 28 such as a fluid-elastomeric lead/lag damper is mounted between each rotor blade 22 and each hub arm 24A. It should be understood that other arrangements of the lead/lag damper 28 may alternatively benefit from this disclosure.

The primary mount for each rotor blade 22 is an elastomeric bearing array 30 which may include a spherical bearing 32 and thrust bearing 34 (FIG. 2). Blade 22 is attached to a radial inner end of thrust bearing 34 through a cuff attachment 36 which may be bolted to the blade root through bifurcated arms 38. The inner end of the cuff attachment 36 forms a spindle 40, which passes through the elastomeric bearing array 30 and is attached thereto with a threaded retainer 42

(FIG. 2). A control horn 23, by which pitch change inputs are made to the rotor blade 22, extends from the spindle 40.

Referring to FIG. 2, an inner race 34i of the thrust bearing 34 may be mounted to the spindle 40 by a spline connection 46. An outer race 34o of the thrust bearing 34 is connected to an inner race 32i of the spherical bearing 32. An outer race 32o of the spherical bearing 32 is bolted to the external end face of the hub arm 24A.

A journal bearing 52 may be positioned between the inner race 44 and the spindle 40 to accommodate shear loading. With the blade thus attached to the elastomeric bearing array 30, the centrifugal force created by rotor blade rotation will impose compressive loading on the bearings 32, 34. These bearings may be manufactured of a laminated elastomeric construction which react high compressive loads and allow limited motion in shear.

The bearings 32, 34 share operational blade motions as the rotor blade changes in pitch by rotation about a blade feathering axis F. During flight, each blade will make excursions as a function of the instant load on the particular blade, which is related to, for example, the aircraft maneuver, aircraft gross weight, air density, etc. The focal point 54 for blade articulation lies on axis F and at the center of the spherical bearing 32. Under a full operative compressive load, this focal point 54 may shift outward a slight amount as the elastomeric laminates of both bearings 32, 34 are compressed.

Mechanical stops such as a droop stop 60 and a flap stop 70 limit droop and flap angles to predetermined maximums, in both flight and static conditions. Similarly, while designed to operate at a specific angular relationship with regard to the blade feathering axis F each blade will also make in-plane excursions such that the blade may occasionally lag behind or lead ahead of operational position by as much as ten degrees under certain conditions; namely when starting and when braking.

Figure 3:
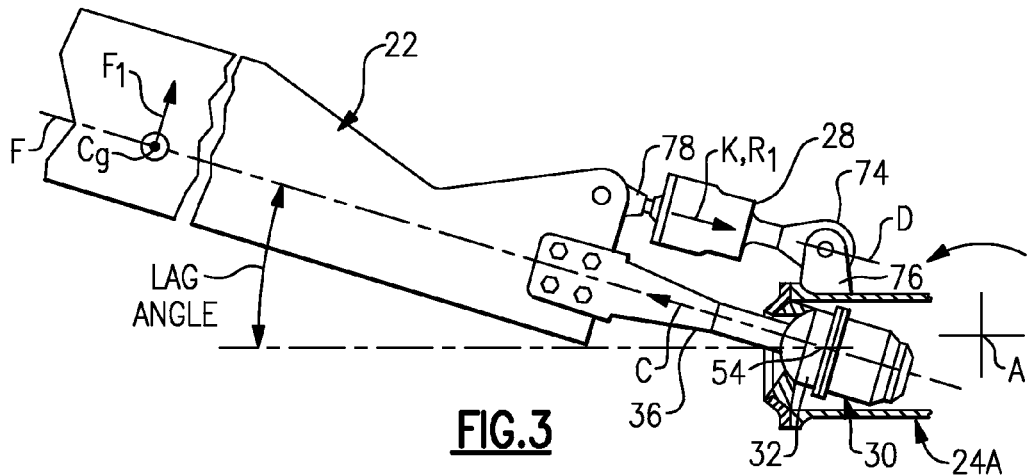
FIG. 3 is a schematic view of a rotor blade and fluid-elastomeric lead/lag damper during rotor starting, illustrating the applicable forces.
Figure 4:
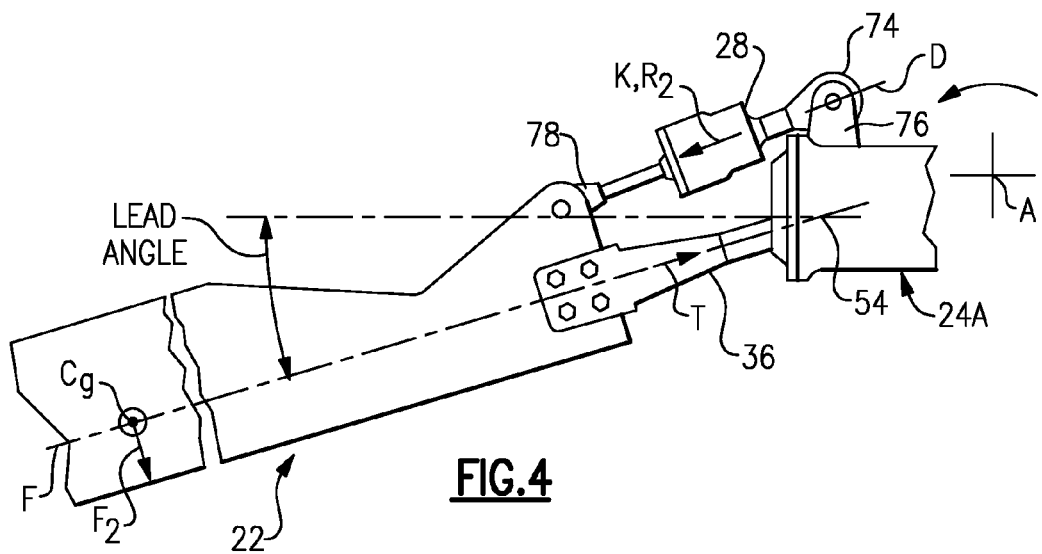
FIG. 4 is a schematic view of a rotor blade and fluid-elastomeric lead/lag damper during rotor braking, illustrating the applicable forces.

Referring to FIGS. 3 and 4, the angles of maximum lead or lag are schematically illustrated for the counterclockwise rotation of the rotor head about axis of rotation A. Such in-plane blade motion is moderated by the lead/lag damper 28, such as a fluid-elastomeric lead/lag damper, which is oriented to stroke along a damper axis D in a direction generally parallel to blade feathering axis F. An inner end of the damper 28 is connected by a spherical rod end bearing 74 to the hub arm 24A at a flange 76 which extends therefrom. An outer end of the damper 28 is connected with a spherical rod end bearing 78 adjacent the root end of the rotor blade 22. It should be understood that other arrangements of the lead/lag damper 28 may alternatively benefit from this disclosure.

The fluid-elastomeric lead/lag damper 28 eliminates external dynamic seals which are a significant contributor to maintenance of a hydraulic lead/lag damper. Fluid-elastomeric lead/lag dampers, however, have a spring rate K whereas hydraulic lead/lag dampers do not. The spring rate K generates a load in response to rotor blade lead/lag position which, unlike a hydraulic lead/lag damper that only reacts rotor braking torque when bottomed, the fluid-elastomeric lead/lag damper will react rotor braking torque throughout any extension from a neutral position. This results in the lead position of the rotor blade being variable when the rotor brake is applied due to, for example, the magnitude of rotor braking torque, % Nr and stiffness of the fluid-elastomeric lead/lag damper which also varies in response to manufacturing, age, temperature, etc. Unlike hydraulic lead/lag dampers which only generate an inboard pulling force when bottomed, the fluid-elastomeric lead/lag damper will generate an inboard pulling force throughout any extension.

Referring to FIG. 3, the action of rotor starting is schematically illustrated where rotation is counterclockwise. With the rotor blade 22 at rest, acceleration of the rotor hub produces an inertia force F1 in each rotor blade which acts at the blade center of gravity (Cg) about the focal point 54 of the spherical bearing 32, which causes the rotor blade to lag behind an otherwise operational position. As the lag angle increases, the lead/lag damper 28 collapses. The fluid-elastomeric lead/lag damper spring rate K generates a load in response to rotor blade position. As the lead/lag damper 28 collapses, an inward force as expressed by vector R1 is imposed on the lead/lag damper 28 and the hub attachment 74. An equal and oppositely directed reaction load is imposed outwardly along blade axis F, which load is depicted by vector (C). Such outwardly directed load introduces a compressive force on the elastomeric bearing array 30 which force is additive to the compressive load generated on the elastomeric bearing array 30 due to the centrifugal force developed by rotor blade rotation. The elastomeric bearing array 30 is inherently able to sustain such combined compressive loadings.

Referring to FIG. 4, the action of rotor braking is schematically illustrated where rotation is counterclockwise. Application of a rotor brake B (FIG. 2) to the main rotor system 20, as the rotor blade 22 continues to rotate under its own inertia, produces an inertia force F2 in each blade acting at the blade center of gravity Cg about the focal point 54 of the spherical bearing 32. The blade lead angle increases as the lead/lag damper 28 extends. The fluid-elastomeric lead/lag damper spring rate K generates a load in response to rotor blade position. As the lead/lag damper 28 extends, an outward force as expressed by vector R2 is imposed on the lead/lag damper 28 and the hub attachment 74. Likewise, an equal and oppositely directed reaction load is imposed inwardly along blade axis F, which load is depicted by vector (T). To bring the main rotor system 20 to a stop in a short time, as may be desired in the case of a shipboard landing, the rotor brake B will be applied shortly after power is removed from the rotor system, such as when rotation speed has decayed to about 60-75%. With the rapid decay of the centrifugally generated force, and the presence of the oppositely directed reactive load (T), there will come a time or times when the summation of the two is a resultant inward directed force. If allowed to reach the elastomeric bearing array 30, this inward directed force could place the elastomeric bearing array 30 in tension, which may effect a rupture of the elastomeric bearing array 30.

Figure 5:
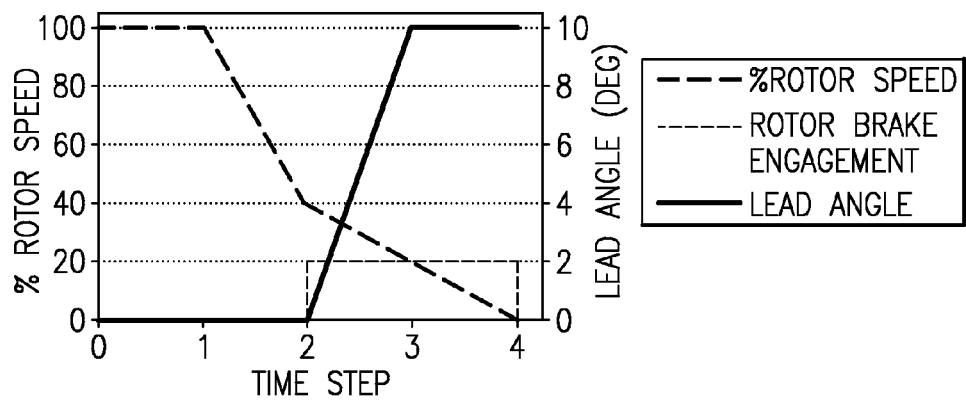
FIG. 5 is chart illustrating theoretical blade lead motion during rotor braking with a RELATED ART hydraulic lead/lag damper.
Figure 6:
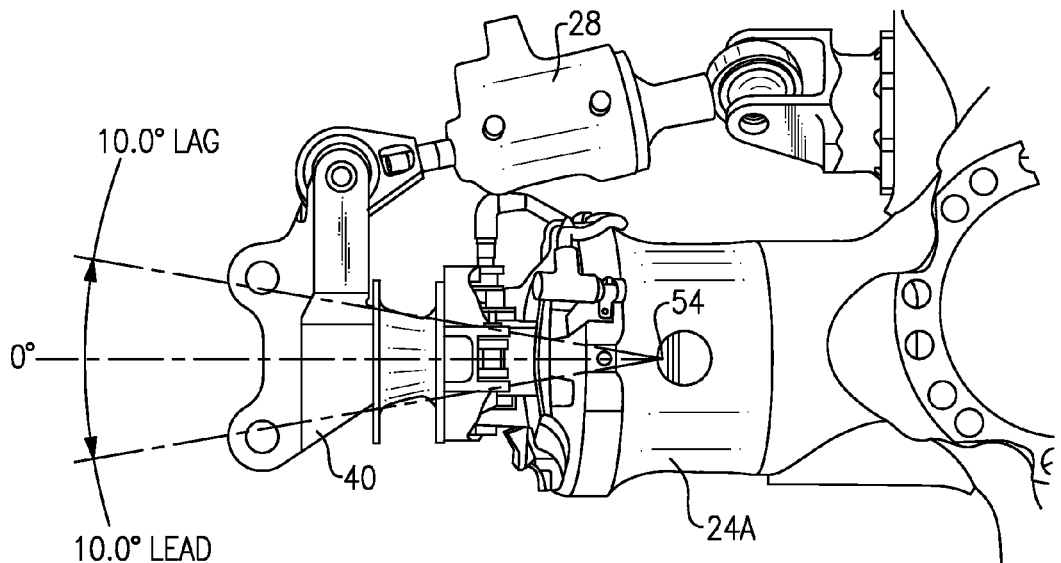
FIG. 6 is a top view which schematically illustrates one of the hub arms and a rotor blade in-plane lead/lag range.

Referring to FIG. 5, theoretical blade motion during rotor shutdown and braking with a related art hydraulic lead/lag damper is schematically illustrated. It should be understood, that FIG. 5 is not to scale with respect to Time Steps in real-time. For example, the time between step 1 and 2 during rotor shutdown may be longer than the time spent during rotor braking during steps 2 through 4. Lead angle is measured with respect to a plane coming straight out of the hub arms (FIG. 6).

During steps 0-1, the main rotor system is at 100% Rotor Speed (dashed) and 0 degrees lead (solid) due to centrifugal force (CF) which acts on the rotor blade. During steps 1-2, the main rotor system is being shutdown. At step 2, the rotor brake is engaged (dotted) at 40% Rotor Speed and the negative torque on the main rotor shaft causes the rotor blade to lead. The related art hydraulic lead/lag damper allows the rotor blade to lead, but bottoms out at full lead at step 3. The bottoming out of the hydraulic lead/lag damper essentially forms a tension link, and continued braking causes the spindle to be pulled inboard into the rotor hub arm and place the elastomeric bearing array into tension. A lead stop for the related art hydraulic lead/lag damper stops the inboard motion of the spindle 40, but need only engage a full 10 degrees of lead with respect to the rotor hub arm. At step 4, the rotor system is stopped and the rotor brake disengaged.

Figure 7:
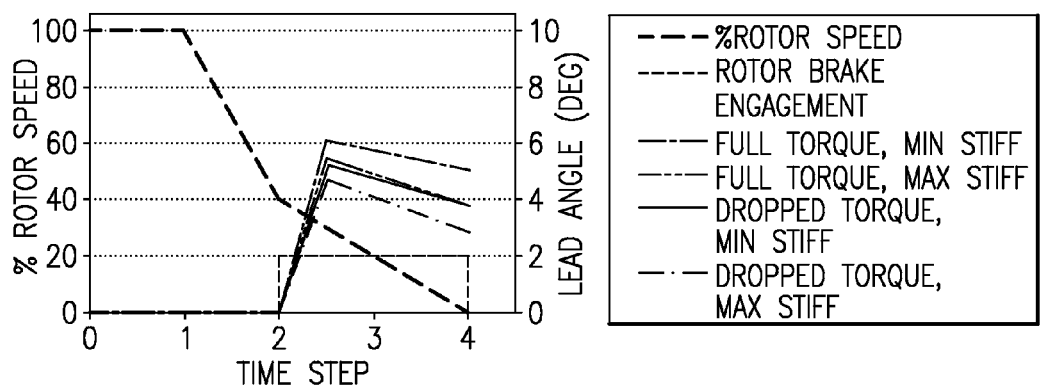
FIG. 7 is chart illustrating theoretical blade lead motion during rotor braking with a fluid-elastomeric lead/lag damper.

Referring to FIG. 7, utilization of the fluid-elastomeric lead/lag damper 28 introduces stiffness characteristics which will cause restriction of blade motion in the lead direction as the main rotor system 20 is braked. During rotor braking, it is unlikely the fluid-elastomeric lead/lag damper 28 will bottom out in the lead direction, but due to the spring rate K of the fluid-elastomeric lead/lag damper 28, the fluid-elastomeric lead/lag damper 28 will attempt to return to an unstressed neutral design length. That is, the fluid-elastomeric lead/lag damper 28 has a neutral design length to which the fluid-elastomeric lead/lag damper 28 will always attempt to return. This is different than a hydraulic lead/lag damper which does not have a neutral design length. The distance from neutral design length is represented by stiffness or, as defined herein, spring rate K. The fluid-elastomeric lead/lag damper 28 may also have stiffness tolerances which change spring rate K due to, for example, manufacture variations, age, and temperatures. Such stiffness tolerance variance imparts uncertainty in the prediction of steady lead angles during rotor braking.

When incorporated into main rotor system 20 with the elastomeric bearing array 30 and a rotor brake B (FIG. 2), the fluid-elastomeric lead/lag damper 28 requires a lead stop assembly 80 (FIG. 8) which will prevent the elastomeric bearing array 30 from being placed in tension over a wide range of blade lead/lag angles rather than at a single full lead position, as is the case with the related art hydraulic lead/lag damper.

Referring to FIG. 7, theoretical blade motion during rotor shutdown and braking with the fluid-elastomeric lead/lag damper 28 is schematically illustrated. It should be understood, that FIG. 7 is not to scale with respect to Time Steps in real-time. For example, the time between step 1 and 2 during rotor shutdown may be longer than the time spent during rotor braking during steps 2 through 4. Lead angle is measured with respect to a plane coming straight out of the hub arms (FIG. 6).

Displayed on the chart again are % Rotor Speed (dashed) and Rotor Brake Engagement (dotted). To show how blade lead angles can vary, the chart of FIG. 7 considers two of the many variables which impart uncertainty when predicting lead angles. It should be understood that other factors which may increase or decrease lead angle which were not taken into account may include, but not be limited to: rotor speed at which rotor brake is engaged (generally engaged at 40%); Pitch angle of the rotor blade; wind loads; etc.

Four cases are illustrated in FIG. 7: full rotor braking torque with minimum (a) and maximum (b) stiffness based on, for example, manufacture variability and age stiffening tolerances, and dropped rotor braking torque (25%, percent, less) with minimum (c) and maximum stiffness (d). It may be necessary to include reduced torque, because from the initiation of rotor brake engagement, the torque drops off over time due to heat and other considerations. As illustrated, there may be a significant variance in calculated lead angles between these four cases.

Figure 8:
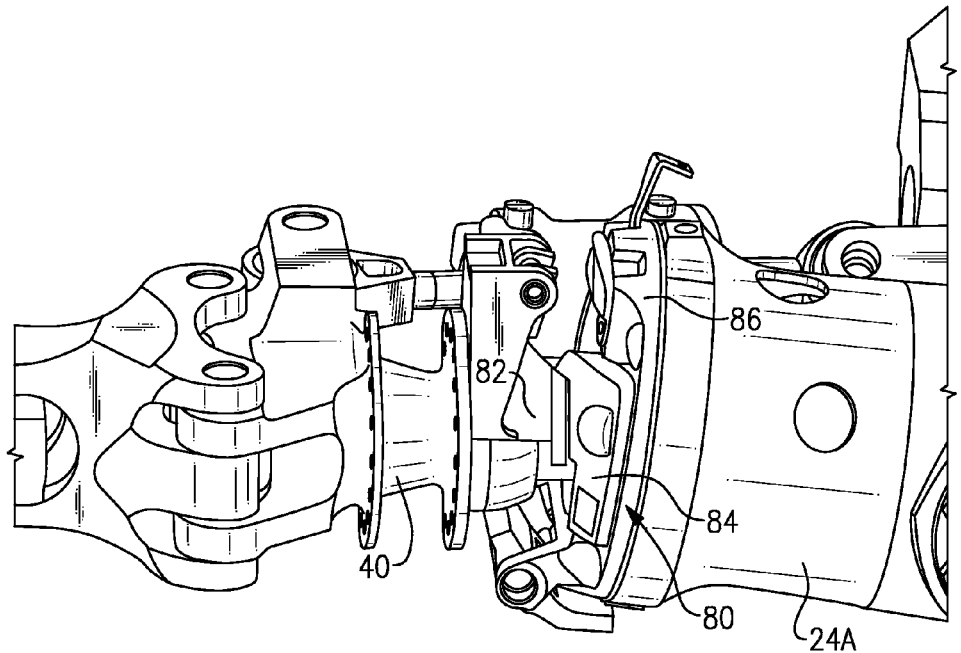
FIG. 8 is an expanded perspective view of a rotor system hub arm with a lead stop assembly according to the present disclosure.
Figure 9A:
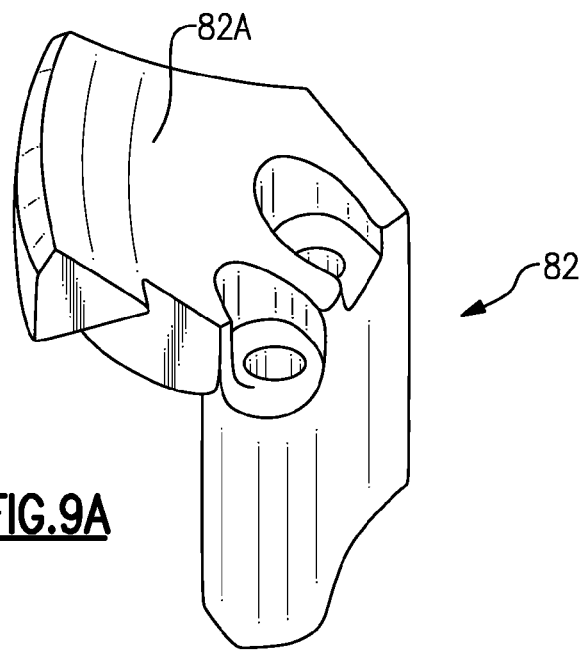
FIG. 9A is an expanded perspective view of a lead stop according to the present disclosure.
Figure 9B:
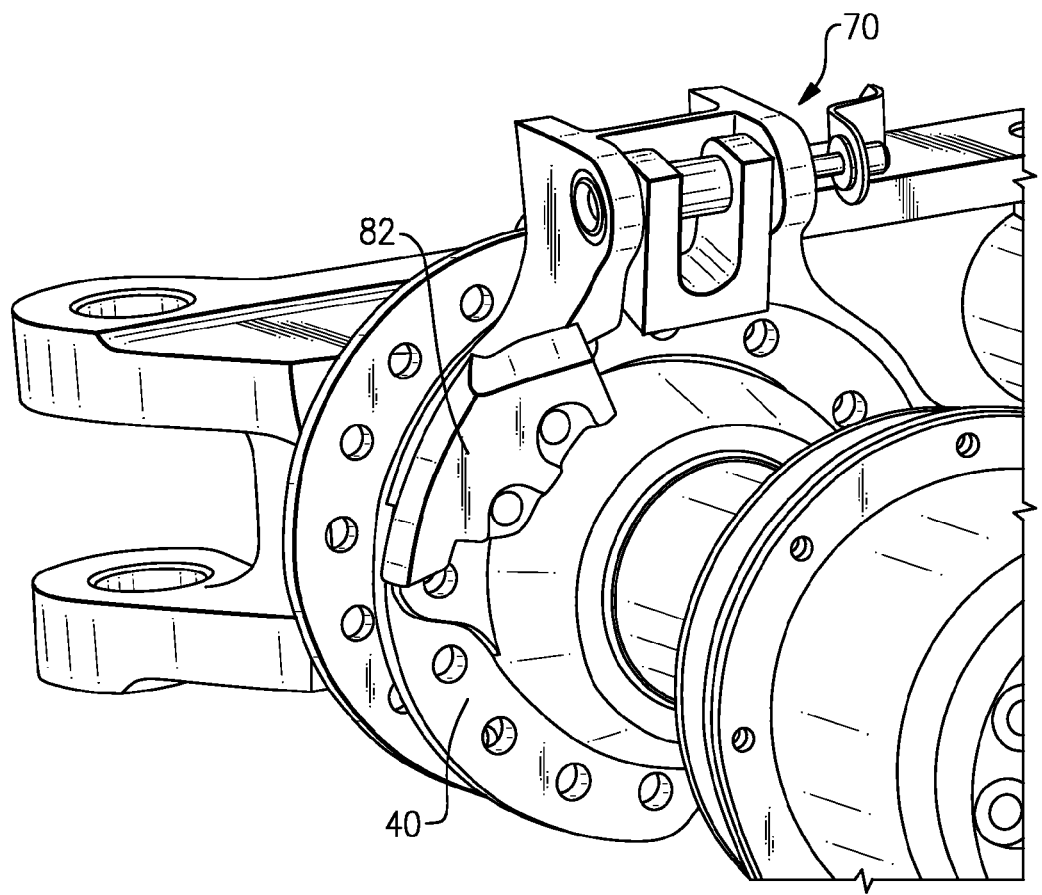
FIG. 9B is an expanded perspective view of the lead stop mounted to a rotor blade spindle.
Figure 10A:
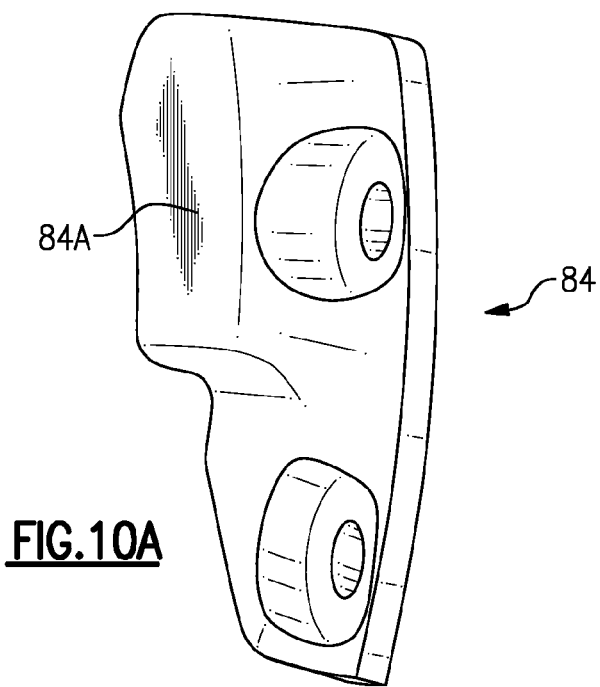
FIG. 10A is an expanded perspective view of a lead stop plate according to the present disclosure.
Figure 10B:
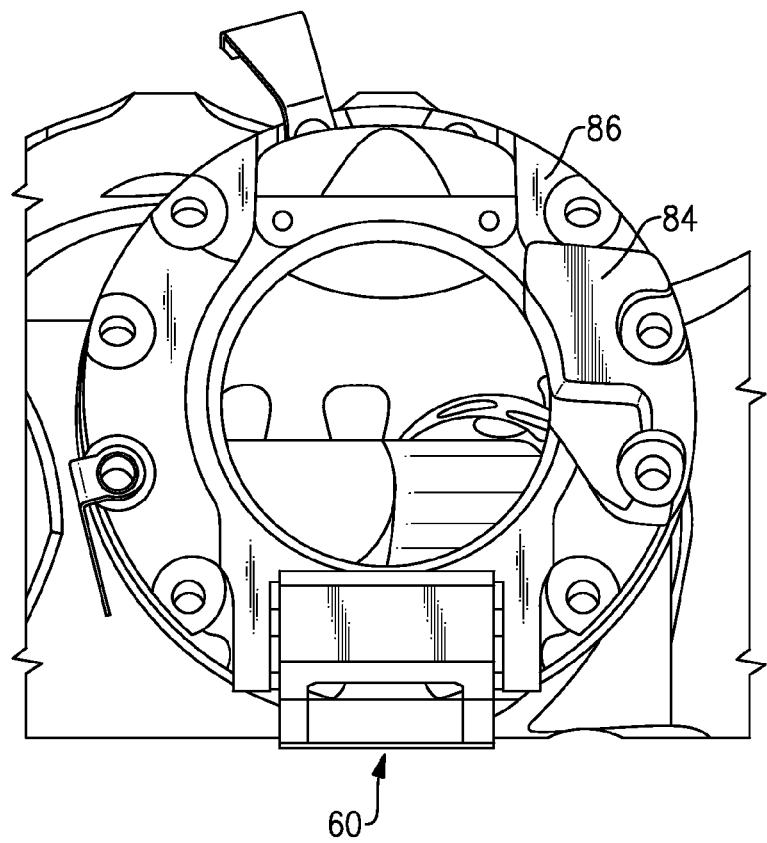
FIG. 10B is an expanded perspective view of the lead stop plate mounted to a rotor blade hub arm.

Referring to FIG. 8, the lead stop assembly 80 includes a lead stop 82 (FIG. 9A) attached to the spindle 40 (FIG. 9B) and a lead stop plate 84 (FIG. 10A) attached to a hinge bearing plate 86 (FIG. 10B) of each hub arm 24A. The lead stop 82 may be bolted to the spindle 40 and the lead stop plate 84 may be bolted to the hinge bearing plate 86 at pre-existing threaded fastener apertures. The lead stop 82 is attached to the spindle 40 adjacent the flap stop 70 (FIG. 9B) but does not interfere with operation thereof. The lead stop 82 is attached to the spindle 40 adjacent the droop stop 60 (FIG. 10B) but does not interfere with operation thereof.

The lead stop 82 and the lead stop plate 84 include a respective corresponding spherical contact surfaces 82A, 84A (FIGS. 9A and 10A, respectively) centered about the elastomeric bearing focal point 54 at the center of the elastomeric bearing array 30, typically the focal point 54 of the spherical bearing 32 contained within the rotor hub arm 24A. The lead stop spherical contact surface 82A may be a concave semi spherical surface while the lead stop plate spherical contact surface 84A may be a convex semi-spherical surface.

The spherical contact surface 82A provided by the lead stop 82 and the spherical contact surface 84A provided by the lead stop plate 84 are located at a predetermined radial distance from the rotor blade feathering axis F which allows sphere-to-sphere contact for a wide lead range (i.e., 0, zero, degrees to 10, ten, degrees lead angle) without impediment to motion of the spindle 40 throughout the full flight envelope. More specifically in an exemplary embodiment, the two spherical contact surfaces 82A, 84A are placed a predetermined, large radial distance from the axis (e.g., F) of the spindle so that these surfaces will provide an overlapping spherical contact surface as the spindle leads from 0 (zero) degrees to 10 degrees (e.g., the full lead range), while being far enough away from the axis (e.g., F) that the spindle will not contact the stationary spherical contact surface 84A as the spindle leads. Only a small contact area between contact surfaces 82A, 84A is typically provided, and in an exemplary embodiment, it is not intentional that the contact area increases with increasing lead angle. However, the potential tensile load on the elastomeric bearing (or pressure on the lead stop contact surface) does increase with increasing lead angle, so that a design where contact area increases with increasing lead angle can be beneficial in certain applications in order to counteract the potential tensile load. It is further noted that contact between the lead stop 82 and the lead stop plate 84 typically reduces the reaction load (depicted by vector T in FIG. 4) to near zero or to zero. In an exemplary embodiment, the contours of the contact surfaces 82A and 84A are designed to allow contact over a certain range of lead angles (e.g., zero to 10 degrees, as in the examples above, although this range is merely exemplary), while allowing relatively free movement of the spindle over this range. Thus, the lead stop assembly 80 thereby enables the utilization of the fluid-elastomeric lead/lag damper 28 by reducing tension (typically to a very small value near zero) on the blade retention elastomeric bearings during certain lead angles.

Figure 11B:
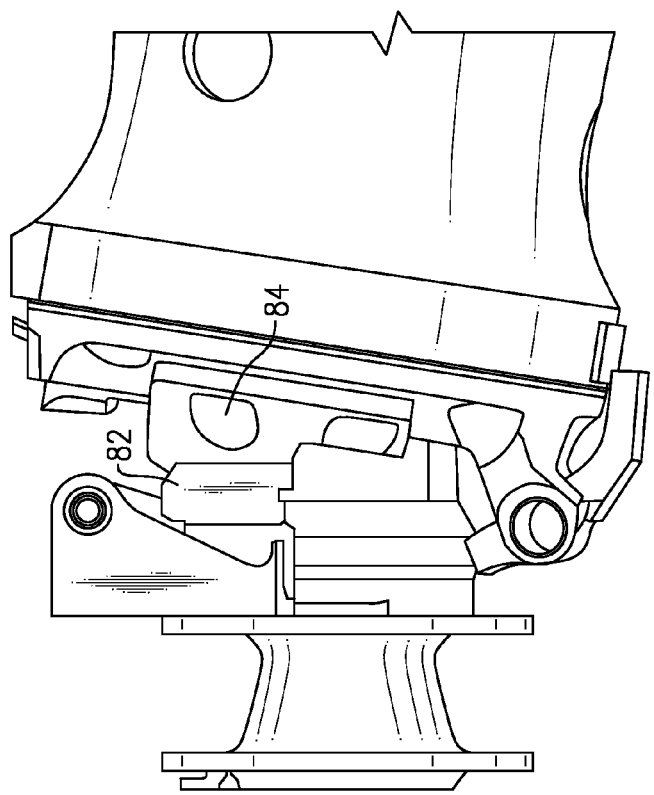
FIGS. 11A and 11B illustrate lead stop assembly engagement at 0 deg lead and 0 deg pitch, with the rotor blade resting on the droop stop.
Figure 11A:
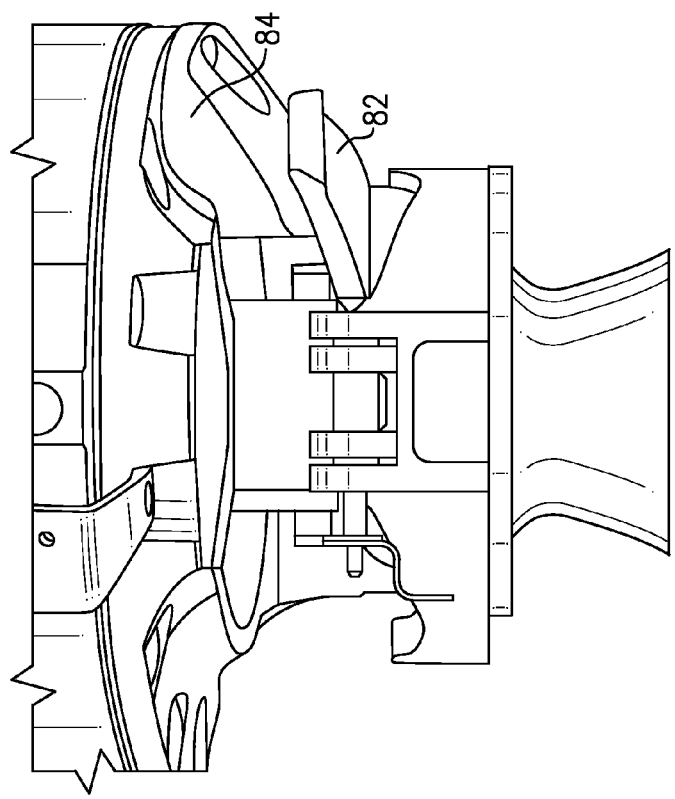

Examples of the sphere to sphere contact between the lead stop 82 and the lead stop plate 84 for a wide lead range are illustrated in FIGS. 11-13. FIGS. 11A and 11B illustrates lead stop assembly 80 engagement at 0 (zero) deg lead and 0 (zero) deg pitch, with the rotor blade resting on the droop stop. FIGS. 12A and 12B illustrates lead stop assembly 80 engagement at 10 deg lead and 0 (zero) deg pitch, with the rotor blade resting on the droop stop 60. FIGS. 13A and 13B illustrate lead stop assembly 80 engagement at 0 (zero) deg lead and maximum positive pitch, with the rotor blade resting on the droop stop 60. The lead stop assembly 80 also provides for spherical contact even were the droop stop to hang up in the dynamic position. It is noted that contact surfaces 82A, 84A are spherical with the center of the sphere at the center of the spherical blade retention bearing 54 so as to insure a uniform clearance between the spherical contact surfaces for any lead angle. Any other contour may likely cause interference, binding, or clearance variations as the blade leads. It is further noted that the lead stop 82 and the lead stop plate 84 (and their corresponding contact surfaces 82A, 84A, respectively) may be designed to start contacting at other than zero degrees lead angle. For instance, they could contact at one degree lead angle.

It should be understood that relative positional terms such as "forward," "aft," "upper," "lower," "above," "below," and the like are with reference to the normal operational attitude of the vehicle and should not be considered otherwise limiting.

It should be understood that like reference numerals identify corresponding or similar elements throughout the several drawings. It should also be understood that although a particular component arrangement is disclosed in the illustrated embodiment, other arrangements will benefit herefrom.

Although particular step sequences are shown, described, and claimed, it should be understood that steps may be performed in any order, separated or combined unless otherwise indicated and will still benefit from the present invention.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the invention may be practiced other than as specifically described. For that reason the appended claims should be studied to determine true scope and content.

What is claimed is:

1. A rotor system comprising:
   a rotor hub arm;
   a spindle;
   an elastomeric bearing array which supports said spindle relative to said rotor hub arm;
   a lead/lag damper mounted to said rotor hub arm and said spindle;
   a lead stop mounted to said spindle; and
   a lead stop plate mounted to said rotor hub arm, said lead stop operable to contact said lead stop plate over a lead angle range of said spindle relative said rotor hub arm.

2. The rotor system as recited in claim 1, wherein each of said lead stop and said lead stop plate define a respective spherical contact surface.

3. The rotor system as recited in claim 2, wherein said spherical contact surfaces have a contour defined by a radius originating at said elastomeric bearing array.

4. The rotor system as recited in claim 2, wherein said spherical contact surfaces have a contour defined by a radius originating at a center of a spherical bearing of said elastomeric bearing array.

5. The rotor system as recited in claim 1, wherein said lead/lag damper is a fluid-elastomeric lead/lag damper.

6. The rotor system as recited in claim 1, wherein said lead angle range is between 0 (zero) and 10 degrees.

7. The rotor system as recited in claim 1, wherein each of said lead stop and said lead stop plate define a respective contact surface such that there are two contact surfaces, and wherein said two contact surfaces are placed a predetermined radial distance from an axis of the spindle so that these two surfaces will provide an overlapping contact surface as the spindle leads from a predetermined lead angle of said lead angle range to a maximum lead angle of said lead angle range, while being placed far enough away from the axis that the spindle will not contact the contact surface of the lead stop plate as the spindle leads through the entire lead angle range.

8. The rotor system as recited in claim 7, wherein the predetermined lead angle is zero.

9. The rotor system as recited in claim 7, wherein the predetermined lead angle is other than zero.

10. The rotor system as recited in claim 1, wherein each of said lead stop and said lead stop plate define a respective contact surface.

11. The rotor system as recited in claim 10, wherein each of the contact surfaces is defined so that contact area between the two contact surfaces increases with increasing lead angle of the spindle.

12. The rotor system as recited in claim 10, wherein each of the contact surfaces is defined so that contact area between the two contact surfaces remains approximately constant with increasing lead angle of the spindle.

13. The rotor system as recited in claim 2, wherein said spherical contact surface of said lead stop plate is a convex semi-spherical surface, and wherein said spherical contact surface of said lead stop is a concave semi-spherical surface.

14. The rotor system as recited in claim 1, including a hinge bearing plate attached to said rotor hub arm, said lead stop plate attached to said hinge bearing plate.

* * * * *